US 7,206,605 B2

(12) United States Patent
Hattori

(10) Patent No.: US 7,206,605 B2
(45) Date of Patent: Apr. 17, 2007

(54) RADIO RECEIVER

(75) Inventor: Wataru Hattori, Tokyo (JP)

(73) Assignee: NEC Corporation, Tokyo (JP)

( * ) Notice: Subject to any disclaimer, the term of this patent is extended or adjusted under 35 U.S.C. 154(b) by 259 days.

(21) Appl. No.: 10/467,764

(22) PCT Filed: Feb. 8, 2002

(86) PCT No.: PCT/JP02/01065

§ 371 (c)(1),
(2), (4) Date: Dec. 22, 2003

(87) PCT Pub. No.: WO02/065653

PCT Pub. Date: Aug. 22, 2002

(65) Prior Publication Data

US 2005/0020229 A1 Jan. 27, 2005

(30) Foreign Application Priority Data

Feb. 13, 2001 (JP) .............................. 2001-036228

(51) Int. Cl.
*H04M 1/00* (2006.01)
*H04B 1/10* (2006.01)
(52) U.S. Cl. ...................... 455/561; 455/217; 455/296; 417/152; 62/269; 62/440
(58) Field of Classification Search ................ 455/571, 455/296, 307, 341, 347, 561, 217; 417/48, 417/152, 153; 62/114, 269, 268, 600, 440
See application file for complete search history.

(56) References Cited

U.S. PATENT DOCUMENTS

| 4,494,381 | A | * | 1/1985 | Lessard ...................... 62/55.5 |
| 4,838,035 | A | * | 6/1989 | Carlson et al. ............... 62/55.5 |
| 5,002,464 | A | * | 3/1991 | Lee .............................. 417/152 |
| 6,205,340 | B1 | * | 3/2001 | Yandrofski et al. .......... 455/561 |
| 6,367,266 | B1 | * | 4/2002 | Kobayashi et al. ........... 62/51.1 |
| 6,480,706 | B1 | * | 11/2002 | Mimura et al. .............. 455/140 |
| 6,571,110 | B1 | * | 5/2003 | Patton et al. ................ 455/561 |
| 6,622,028 | B1 | * | 9/2003 | Abdelmonem et al. ...... 455/561 |
| 6,963,758 | B2 | * | 11/2005 | Narahashi et al. ........... 455/561 |

FOREIGN PATENT DOCUMENTS

| JP | 2-1993 | 1/1990 |
| JP | 7-249388 | 9/1995 |

(Continued)

*Primary Examiner*—Edward F. Urban
*Assistant Examiner*—Blane J. Jackson
(74) *Attorney, Agent, or Firm*—Scully, Scott, Murphy & Presser, P.C.

(57) ABSTRACT

A radio receiver disclosed is composed of a signal processing part, which includes a receive band pass filter 2 and a receive low noise amplifier 3, to process receive signal and discharge gas with time, the signal processing part being cooled by the cooling means 6, wherein the radio receiver is provided with an airtight container 10 that operates as inner sealing means to seal the receive band pass filter 2 and the receive low noise amplifier 3 to retain the gas, and a vacuum container 5 that operates as outer sealing means to seal in vacuum the airtight container 10 such that an interspace 12 between that and the airtight container 10 forms a vacuum insulating space to insulate in vacuum the airtight container 10 from outside.

21 Claims, 3 Drawing Sheets

FOREIGN PATENT DOCUMENTS

| | | |
|---|---|---|
| JP | 10-135525 | 5/1998 |
| JP | 11-248845 | 9/1999 |
| JP | 2000-111185 | 4/2000 |
| JP | 2000-257967 | 9/2000 |
| JP | 2001-136083 | 5/2001 |
| JP | 2001-144635 | 5/2001 |

* cited by examiner

RADIO RECEIVER

TECHNICAL FIELD

This invention relates to a radio receiver and, particularly, to a radio receiver that is applied to a base station radio device for mobile communication and satellite communication and that receives a desired signal while having its signal processing part cooled.

BACKGROUND ART

A conventional radio receiver, which is applied to base station radio device, is as shown in FIG. 1 composed of an antenna terminal 51, a receive band pass filter 52 that selects a desired band signal from receive signal to be inputted from the antenna terminal 51, a receive low noise amplifier 53 that amplifies the output of the receive band pass filter 52 with low noise up to a desired level, a receive signal output terminal 54 that outputs the receive signal amplified by the receive low noise amplifier 53, a vacuum container 55 that seals in vacuum the receive band pass filter 52 and the receive low noise amplifier 53, a cooling means 56 that cools the interior of the vacuum container 55 through a cooling stage 56a, a first power supply terminal 57 for supplying operating power to the receive low noise amplifier 53, a second power supply terminal 58 for supplying operating power to the cooling means 56, and a housing 59 that houses the vacuum container 55 and the cooling means 56.

The receive band pass filter 52 and the receive low noise amplifier 53 are composing a signal processing part (high-frequency receiving part) and are sealed in vacuum in the vacuum container 55, thereby insulated in vacuum from outside, and are cooled by the cooling means 56.

The inside of the vacuum container 55 is kept in vacuum and insulated in vacuum from outside, and the invasion of heat from outside is thereby blocked out. The receive band pass filter 52 and the receive low noise amplifier 53, which are sealed in vacuum inside the vacuum container 55, are cooled to an extremely low temperature, e.g., about 70 K (nearly equal to −203° C.) by the cooling means 56. The cooling means 6 is, for example, composed of a freezing machine such that can stably keep an extremely low temperature of e.g. 70 K for a long period by a heat exchange cycle using compression and expansion of, e.g., helium gas, and it may be a commercially-available apparatus.

Thus, by cooling the receive band pass filter 52 and the receive low noise amplifier 53 to an extremely low temperature, heat noise occurred in the receive band pass filter 52 and the receive low noise amplifier 53 can be reduced. As a result, noise figure of the radio receiver in FIG. 1 can be significantly reduced and the sensitivity thereof can be significantly improved. Therefore, in this radio receiver, receive output with a regulation C/N (carrier wave/noise power) can be obtained even for a receive signal with low level and transmit power on the transmission side required to get the regulation C/N can be reduced. Such a radio receiver is frequently placed in the air or near the top of antenna tower so as to reduce the loss until inputted to the antenna terminal 51.

The interior of the vacuum container 55 is as described above needed to be kept in vacuum to insulate that from the outside. In the case of radio receiver placed within doors, the interior of the vacuum container 55 is always evacuated by using a vacuum pump. However, in the case that the radio receiver is placed in the air or near the top of antenna tower to be used as a base station device for mobile communication, it is necessary that the radio receiver is miniaturized and lightened to make its installation easy. Thus, it is not desirable that the radio receiver has an external vacuum pump for evacuating always the interior of the vacuum container 55 since it becomes difficult to miniaturize and lighten. Taking the maintenance after installation into account, since the external pump needs a periodical maintenance, the interval of maintenance has to be shortened. This is not desirable since it increases the maintenance cost on the communication service. Therefore, conventionally, in keeping the interior of the vacuum container 55 in vacuum, a vacuum pump is connected to the vacuum container 55 from outside and the vacuum container 55 is sealed up when it becomes evacuated enough for vacuum insulation.

However, in the conventional radio receiver, even after the vacuum container 55 is sealed up when it becomes evacuated enough for vacuum insulation, the gas pressure inside the vacuum container 55 increases since the vacuum insulation degrades with time during a long operation time. Therefore, it is necessary for the interior of the vacuum container 55 to be evacuated periodically and the maintenance cost increase by that much.

This is caused by gas to be discharged from the receive band pass filter 52 and the receive low noise amplifier 53 being sealed in vacuum in the vacuum container 55. Namely, the receive band pass filter 52 and the receive low noise amplifier 53 discharges unnecessary gas such as oxygen, nitrogen and hydrogen with time during the long operation time. When 1000 hours elapse, vacuum insulation in the vacuum container 55 degrades and the cooling efficiency by the cooling means 56 is reduced. As a result, it is necessary for the interior of the vacuum container 55 to be evacuated periodically after about 1000 hour operation and, therefore, the maintenance cost increase by that much. Meanwhile, gas discharged from the inside wall of the vacuum container 55 can be suppressed to a extremely low level by using a ultrahigh vacuum material such as aluminum alloy or electropolishing or passivating the inside wall.

DISCLOSURE OF INVENTION

This invention is invented considering the above problems and is intended to provide a radio receiver that does not need the maintenance work to evacuate air by connecting the vacuum container to the vacuum pump from outside, thereby allowing the reduction in maintenance cost.

For the purpose of solving the problems, according to claim 1, a radio receiver comprises a signal processing part that processes a receive signal, a cooling means that cools the signal processing part and a sealing means that seals in vacuum the signal processing part, wherein the sealing means is composed of an inner sealing means that houses and seals in vacuum the signal processing part, and an outer sealing means that houses the inner sealing means and seals in vacuum the exterior of the inner sealing means.

Also, in the radio receiver defined in claim 2 according to claim 1, the outer sealing means is composed of a plurality of sealing means, and a sealing means of the plurality of sealing means placed nearer the signal processing part is sealed in vacuum in sequence.

Also, in the radio receiver defined in claim 3 according to claim 1 or 2, the sealing means is composed of a vacuum container.

Also, in the radio receiver defined in claim 4 according to claim 3, there is formed a vacuum insulating space between the vacuum container placed inside and the vacuum container placed outside.

Also, in the radio receiver defined in claim 5 according to claim 1 or 2, the cooling means is connected with the inner sealing means.

Also, in the radio receiver defined in claim 6 according to claim 1, 2 or 5, the inner sealing means is provided with a gas absorbing means that has a gas absorption function to condense and trap gaseous molecules.

Also, in the radio receiver defined in claim 7 according to claim 6, the gas absorbing means is composed of a plurality of gas absorbing means that are used according to kind and partial pressure of gas to be absorbed.

Also, in the radio receiver defined in claim 8 according to claim 6 or 7, the gas absorbing means is composed of a gas absorption type pump.

Also, in the radio receiver defined in claim 9 according to claim 8, the gas absorption type pump is composed of a plurality of gas absorption type pumps used according to kind and partial pressure of gas to be absorbed.

Also, in the radio receiver defined in claim 10 according to claim 8 or 9, the gas absorption type pump is composed of ion pump, getter pump sublimation pump or cryopump.

Also, in the radio receiver defined in claim 11 according to claim 6, the gas absorption type pump is composed of fins.

Also, in the radio receiver defined in claim 12 according to claim 6, the gas absorption type pump is composed of a gas absorbing material.

Also, in the radio receiver defined in claim 13 according to claim 12, the gas absorbing material is composed of a plurality of gas absorbing means used according to kind and partial pressure of gas to be absorbed.

Also, in the radio receiver defined in claim 14 according to claim 12 or 13, the gas absorbing material is composed of activated carbon, molecular sieve or silica gel.

Also, in the radio receiver defined in claim 15 according to claim 12 or 13, the gas absorbing material is composed of metal including at least one selected from titanium, aluminum, molybdenum, tantalum, zirconium, barium and niobium.

Also, in the radio receiver defined in claim 16 according to claim 12 or 13, the gas absorbing material is composed of hydrogen storing alloy.

Also, in the radio receiver defined in claim 17 according to any one of claims 1 to 16, at least part of the signal processing part is composed of a superconductive material.

Also, in the radio receiver defined in claim 18 according to claim 17, the superconductive material is composed of a high-temperature superconductor.

BEST MODE FOR CARRYING OUT THE INVENTION

The preferred embodiments of the invention will be explained below with reference to the drawings.

[First Embodiment]

Figure 1:
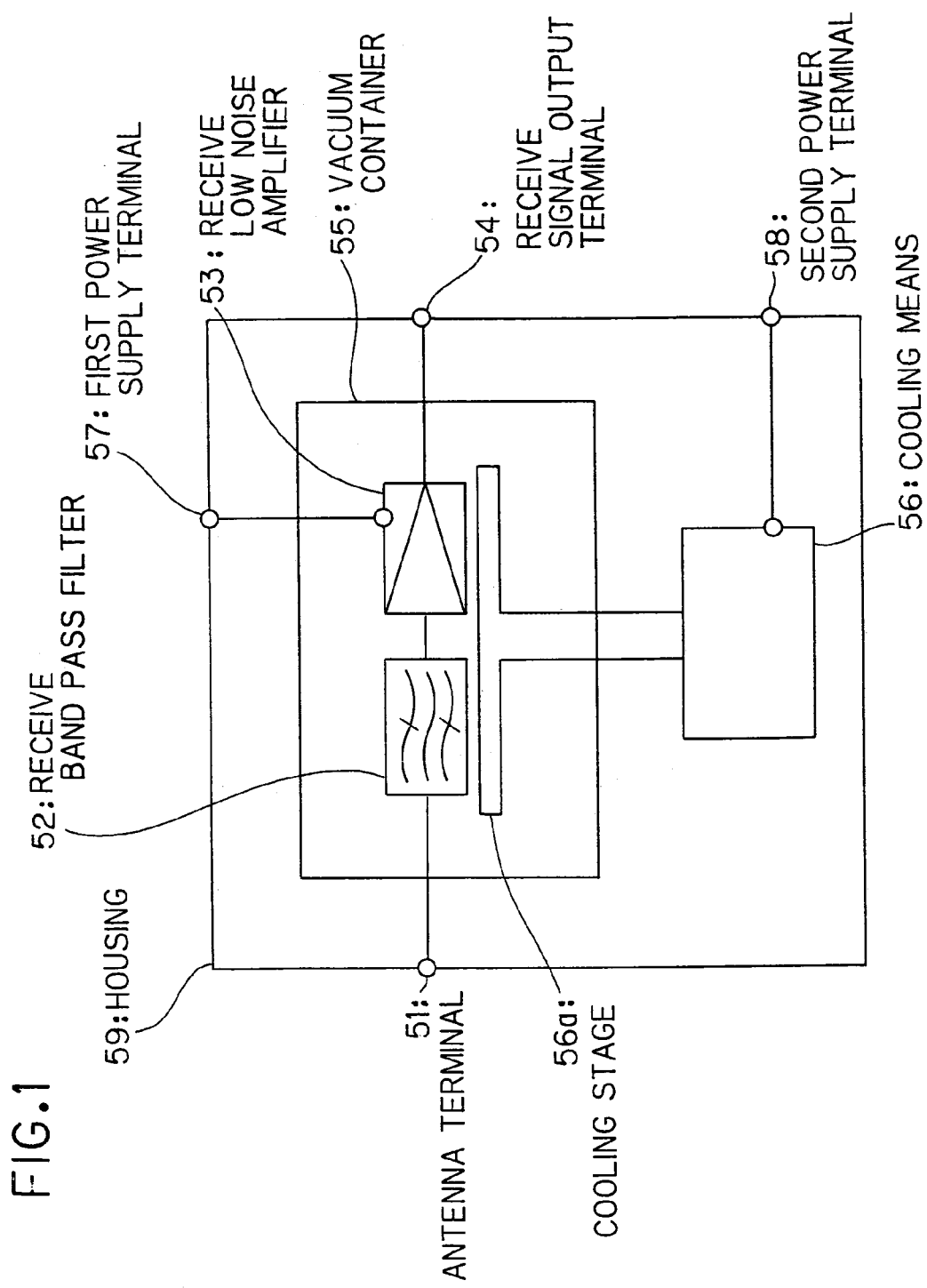
FIG. 1 is an illustration showing the composition of a conventional radio receiver.
Figure 2:
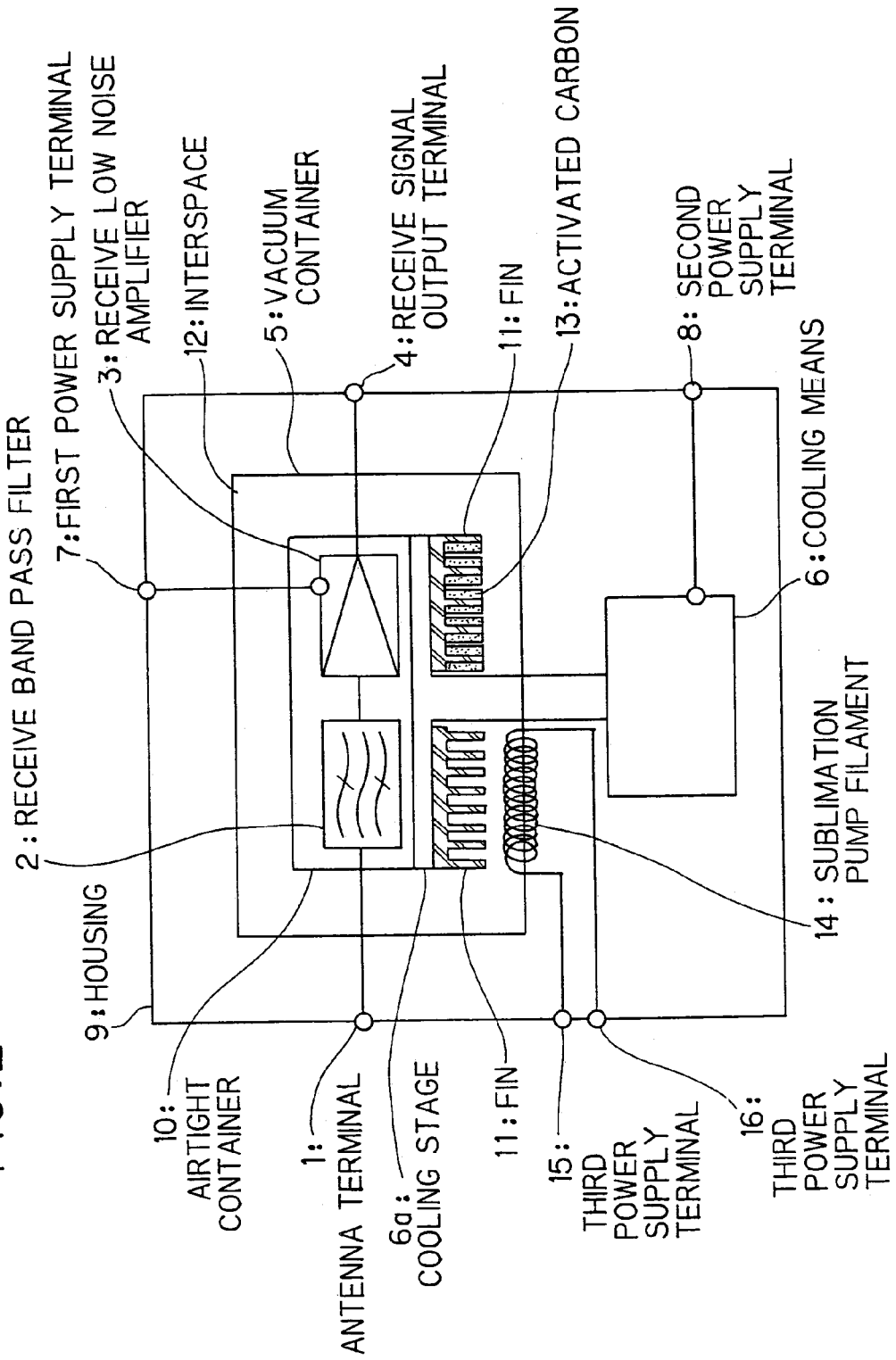
FIG. 2 is an illustration showing the composition of a radio receiver in a first preferred embodiment according to the invention.

FIG. 2 is an illustration showing the composition of a radio receiver in the first preferred embodiment according to the invention.

The radio receiver in this embodiment is, as shown in FIG. 2, composed of an antenna terminal 1, a receive band pass filter 2 that selects a desired band signal from receive signal to be inputted, a receive low noise amplifier 3 that amplifies the output of the receive band pass filter 2 with low noise up to a desired level, a receive signal output terminal 4, an airtight container 10 that seals in vacuum the receive band pass filter 2 and the receive low noise amplifier 3, a vacuum container 5 that seals in vacuum the airtight container 10 such that an interspace 12 between the vacuum container 5 and the airtight container 10 forms a vacuum insulating space, a cooling means 6 that cools the interior of the vacuum container 5 through a cooling stage 6a, fins 11 provided beneath the cooling stage 6a, activated carbon 13 provided on the fins 11, a sublimation pump filament 14 below the fins 11, a first power supply terminal 7 for supplying operating power to the receive low noise amplifier 3, a second power supply terminal 8 for supplying operating power to the cooling means 6, third power supply terminals 15, 16 for supplying operating power to the sublimation pump filament 14, and a housing 9 that houses the vacuum container 5 and the cooling means 6.

The airtight container 10 and the vacuum container 5 functions as an inside sealing means and an outside sealing means, respectively. The vacuum container 5, which seals in vacuum the airtight container 10 such that an interspace 12 between the vacuum container 5 and the airtight container 10 forms a vacuum insulating space, is of stainless alloys, aluminum alloys, FRP (fiberglass reinforced plastic) etc. The degree of vacuum in the airtight container 10 is set such that the airtight container 10 itself can endure, for example, about 100 HPa (hectopascal) or lower. The degree of vacuum in the vacuum container 5 is set about 10 to 3 Pa (pascal) or lower, desirably 10 to 6 Pa or lower.

The cooling means 6 is, for example, composed of a freezing machine such that can stably keep an extremely low temperature of e.g. 70 K for a long period by a heat exchange cycle using compression and expansion of, e.g., helium gas, and it may be a commercially-available apparatus. The fins 11 provided on the cooling stage 6a operate as gas absorption means, and are composing a mechanism that has a gas absorption function to condense and trap gaseous molecules by using the cooling means 6. Also, the activated carbon 13 provided on the fins 11 functions as gas absorbing material to absorb a gas such as oxygen, nitrogen and hydrogen. Further, it has a function that a gas, such as helium and argon, chemically difficult to absorb can also be absorbed while being cooled through the fins 11 by the cooling means 6.

The sublimation pump filament 14 provided under the fins 11 operates not only as gas absorption means but also as a sublimation pump, which is a kind of gas absorption type pump, to compose the gas absorption means. Namely, the sublimation pump filament 14 operates as a sublimation pump such that, by sublimating the surface just before sealing up the vacuum container 5, allows the inside wall of the vacuum container 5 and the surface of the fins 11 near the sublimation pump filament 14 to have a clean activated metal surface with great getter function. Furthermore, the sublimation pump filament 14 is composed such that, even if the gas pressure in the vacuum insulating space increases when the activated metal surface is again covered with absorbed gas to weaken the sublimation function, it can recover the sublimation pump function by temporarily connecting the third power supply terminals 15, 16 with the power source thereby sublimating the surface of the filament 14.

As described above, the radio receiver in this embodiment is provided with the airtight container 10 that operates as inner sealing means to seal in vacuum the signal processing part composed of the receive band pass filter 2 and receive low noise amplifier 3 inside the airtight container 10, and the vacuum container 5 that operates as outer sealing means to seal in vacuum the airtight container 10 such that the interspace 12 between the vacuum container 5 and the airtight container 10 forms the vacuum insulating space being insulated in vacuum from outside. Therefore, gas discharged from the receive band pass filter 2 and the receive low noise amplifier 3 is retained inside the airtight container 10 due to the airtightness of the airtight container 10. In addition, the vacuum insulation between the airtight container 10 and outside does not degrade since the interspace 12 between the airtight container 10 and the vacuum container 5 forms the vacuum insulating space. Hence, the gas pressure inside the vacuum container 5 does not increase.

Accordingly, even when it is driven for a long period, the maintenance work to periodically evacuate air inside the vacuum container 5 is not necessary. Due to this, it is not necessary to stop the cooling by the cooling means 6 in a relatively short period (e.g., 1000 hours as described earlier) and therefore the cooling efficiency can be enhanced. Thus, the signal processing part can be stably operated at a low temperature and therefore the occurrence of noise can be suppressed, thereby enhancing the receiving sensitivity. Also, the vacuum insulating space can effectively block out the heat conduction between outside and the airtight container 10 caused by radiation. Furthermore, the radio receiver can be miniaturized and lighten since it has no external vacuum pump.

Even if the discharged gas leaks outside the airtight container 10 from the airtight container 10 sealing in vacuum the receive band pass filter 2 and the receive low noise amplifier 3, the gas pressure inside the vacuum container 5 can be insulated in vacuum from outside due to the vacuum insulating space.

In this embodiment, the continuous operation in several tens of thousand hours, which are nearly equal to the durable period of the other parts, can be realized without the maintenance work. Therefore, the check interval is elongated ten times or more that of conventional device, and the maintenance cost needed to maintenance work can be reduced significantly.

Furthermore, in this embodiment, the fins 11 with a large surface area are provided on the cooling stage 6a such that they compose the mechanism that has a gas absorption function to condense and trap gaseous molecules by using the cooling means 6. Thus, by this mechanism, components which are easily condensed at a relatively low temperature, such as a gasified water and organic molecules such as oil flowing back from the vacuum pump evacuating air just before sealing up in vacuum can be effectively trapped. Also, the fins 11 with a large surface area are provided with the activated carbon 13 and, by the activate carbon 13, remaining gas such as oxygen, nitrogen and hydrogen can be absorbed and a gas, such as helium and argon, chemically difficult to absorb can also be absorbed while being cooled through the fins 11 by the cooling means 6.

Furthermore, in this embodiment, the sublimation pump filament 14 operates as a sublimation-pump such that, by sublimating the surface just before sealing up the vacuum container 5, allows the inside wall of the vacuum container 5 and the surface of the fins 11 near the sublimation pump filament 14 to have a clean activated metal surface with great getter function. Because of this, especially, oxygen, nitrogen and hydrogen gas can be effectively absorbed and trapped thereby. On the other hand, the sublimation pump filament 14 is composed such that, even if the gas pressure in the vacuum insulating space increases when the activated metal surface is again covered with absorbed gas to weaken the sublimation function, it can recover the sublimation pump function by temporarily connecting the third power supply terminals 15, 16 with the power source thereby sublimating the surface of the filament 14 to have a clean activated metal surface with great getter function again. Moreover, this operation can be conducted while continuing the operation of the radio receiver without stopping the operation thereof. Thus, the operation efficiency of the radio receiver can be enhanced.

Gas absorbing means other than the fins 11 may be used according to kind and partial pressure of gas to be absorbed. For example, the gas absorbing means may be a gas absorption type pump. The gas absorption type pump may be selected from multiple kinds of gas absorption type pumps according to kind and partial pressure of gas to be absorbed. The gas absorption type pump includes, other than the sublimation pump, ion pump, getter pump and cryopump.

Also, the gas absorbing means may be composed such that a copper plate is mounted on a cold head while sandwiching a indium sheet and then a gas absorbing material, which has a better efficiency when cooled, such as plate-forming activated carbon, is mounted on the copper plate. Also, as the gas absorbing means, a gas absorbing material which has a better efficiency when not cooled may be mounted on a wall on the room temperature side of the vacuum insulating apace through a mounting clamp.

The gas absorbing material may be selected from multiple kinds of gas absorbing materials according to kind and partial pressure of gas to be absorbed. For example, the gas absorbing material includes, other than the activated carbon, molecular sieve and silica gel. Furthermore, the gas absorbing material may be composed of metal including at least one selected from titanium, aluminum, molybdenum, tantalum, zirconium, barium and niobium. Else, the gas absorbing material maybe composed of hydrogen storing alloy. These gas absorbing materials have a high gas absorption ability.

As described above, in this embodiment, the radio receiver is composed of the signal processing part, which includes the receive band pass filter 2 and the receive low noise amplifier 3, to process receive signal and discharge gas with time, the signal processing part being cooled by the cooling means 6, wherein the radio receiver is provided with the airtight container 10 that operates as inner sealing means to seal the receive band pass filter 2 and the receive low noise amplifier 3 to retain the gas, and the vacuum container 5 that operates as outer sealing means to seal in vacuum the airtight container 10 such that the interspace 12 between that and the airtight container 10 forms a vacuum insulating space to insulate in vacuum the airtight container 10 from outside. Therefore, by the vacuum insulating space, the vacuum insulation between the airtight container 10 and outside does not degrade and therefore the gas pressure inside the vacuum container 5 does not increase.

Accordingly, even during the operation for a long period, the maintenance work to periodically evacuate air from outside by connecting a vacuum pump to the vacuum container is not necessary.

Thus, the maintenance cost can be reduced.

[Second Embodiment]

Figure 3:
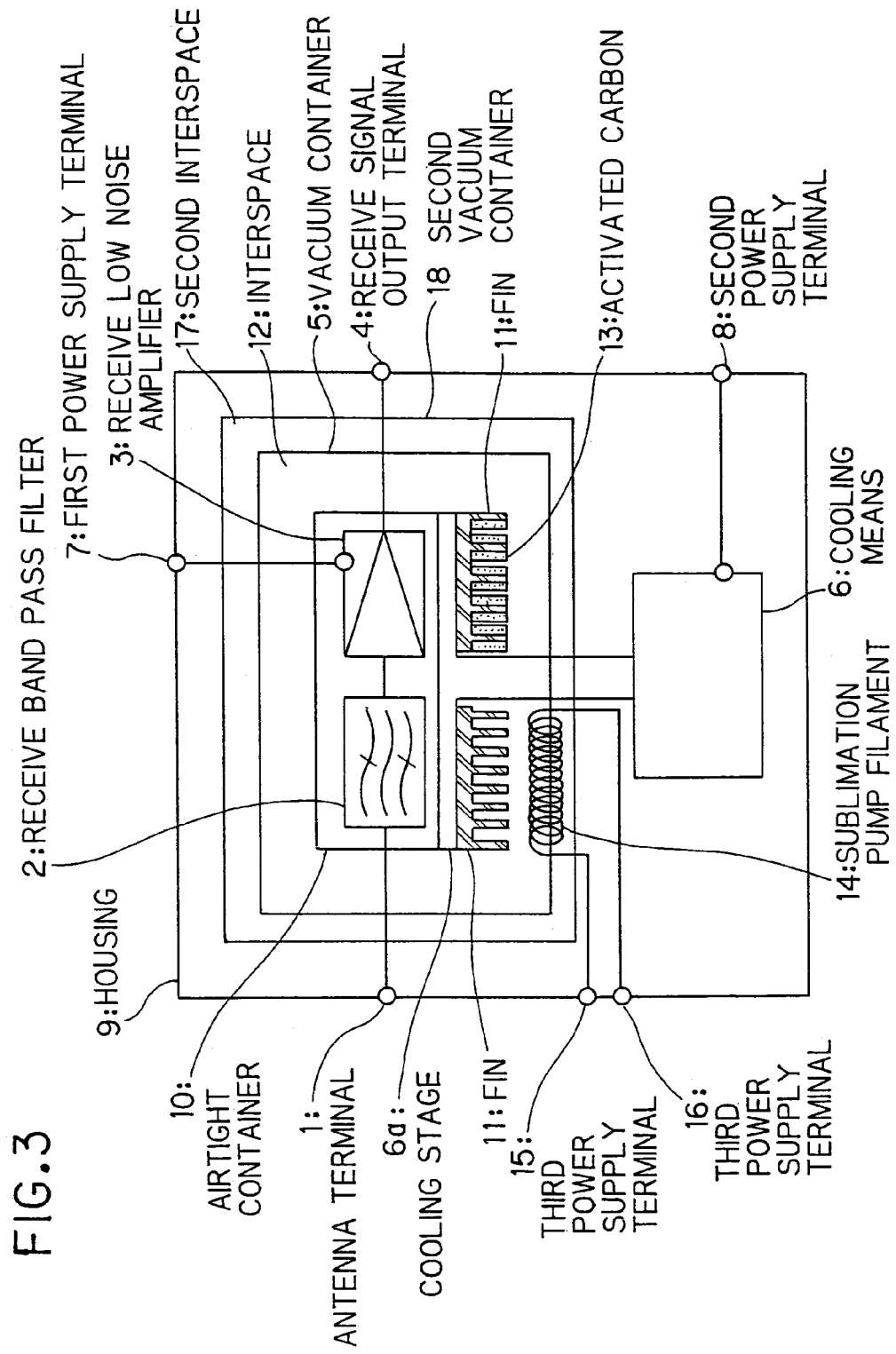
FIG. 3 is an illustration showing the composition of a radio receiver in a second preferred embodiment according to the invention.

FIG. 3 is an illustration showing the composition of a radio receiver in the second preferred embodiment according to the invention. The difference of the radio receiver in the second embodiment from that in the first embodiment is that there are provided two vacuum insulating spaces.

Namely, the radio receiver in the second embodiment includes, as shown in FIG. 3, a second vacuum container 18 that operates as outer sealing means to seal in vacuum the vacuum container 5 such that a second interspace 17 between the second vacuum container 18 and the vacuum container 5 forms a second vacuum insulating space. Material of the second vacuum container 18 that allows the second vacuum insulating space to be formed in the second interspace 17 between the second vacuum container 18 and the vacuum container 5 is of stainless alloys, aluminum alloys, FRP (fiberglass reinforced plastic) etc like the vacuum container 5. The degree of vacuum in the second vacuum container 18 is set nearly the same as that in the vacuum container 5.

In this embodiment, the airtight container 10 to seal in vacuum the receive band pass filter 2 and the receive low noise amplifier 3 is double sealed in vacuum by the vacuum container 5 and the second vacuum container 18, whereby the interspace 12 between the airtight container 10 and the vacuum container 5 forms the first vacuum insulating space and the second interspace 17 between the vacuum container 5 and the second vacuum container 18 forms the second vacuum insulating space. Therefore, the degree of vacuum insulation between the airtight container 10 and outside can be further enhanced by the two vacuum insulating spaces, the first vacuum insulating space and second vacuum insulating space. These vacuum insulating spaces can further effectively block out the heat conduction between outside and the airtight container 10 caused by radiation and therefore the reliability in vacuum insulation can be enhanced.

The other composition than this is similar to that in the first embodiment. Therefore, in FIG. 3, the same numerals are used for the components corresponding to those in FIG. 2 and the explanations there of are omitted here.

Thus, in the second embodiment, the same effects in the first embodiment can be obtained.

Furthermore, in the second embodiment that there are provided the two vacuum insulating spaces, the degree of vacuum insulation between outside and the container to seal in vacuum the signal processing part can be further enhanced, and the maintenance cost can be further reduced.

Although, as abovementioned, the embodiments according to the invention are described with reference to the drawings, the concrete composition of the invention is not limited to these embodiments and modifications that are not apart from the essence of the invention can be included in the invention.

For example, the signal processing part may include at least one of the receive band pass filter 2 and the receive low noise amplifier 3. For example, the receive band pass filter 2 to compose the radio receiver may be of a superconductive material that shows superconductivity at a temperature given by cooling with the cooling means 6. For example, the receive band pass filter 2 maybe composed of microstrip line and the ground layer and signal line composing the microstrip line may be both of a superconductive material. When the receive band pass filter 2 is of a superconductive material, loss in the receive band pass filter 2 can be significantly reduced and therefore the noise figure of the radio receiver can be extremely reduced. As a result, the sensitivity of the radio receiver can be drastically improved.

Further, when a low loss element or steep filtering element is of a superconductive material, the receiving performance can be further enhanced.

The superconductive material to compose the receive band pass filter 2 of the radio receiver may be a high-temperature superconductor. For example, the high-temperature superconductor may be selected from copper oxide superconductors of bismuth series, thallium series, hydrargyrum(Hg) series, yttrium series, silver series and CuTl. Of the high-temperature superconductors, there exists a material that has a transition temperature to superconductor higher than 100 K. In such a superconductor, the state of superconductivity can be obtained only by cooling about 77.4 K, which is boiling point of liquid nitrogen, at 1 atm. Therefore, the cooling requirement of the cooling means 6 can be reduced and a small and inexpensive supercold freezing machine can be used. Also, the load of freezing machine can be reduced by using the high-temperature superconductor and therefore the consumption power of the radio receiver can be reduced or the air cooling thereof can be realized. As a result, the radio receiver can be miniaturized and the manufacturing cost thereof can be reduced.

INDUSTRIAL APPLICABILITY

As described above, in the radio receiver of the invention, the radio receiver is composed of the signal processing part to process receive signal and discharge gas with time, the signal processing part being cooled by the cooling means, wherein the radio receiver is provided with the inner sealing means to seal the signal processing part to retain the gas, and the outer sealing means to seal in vacuum the inner sealing means such that the interspace between that and the inner sealing means forms a vacuum insulating space to insulate in vacuum the inner sealing means from outside. Therefore, by the vacuum insulating space, the vacuum insulation between the inner sealing means and outside does not degrade and therefore the gas pressure inside the outer sealing means does not increase.

Accordingly, even during the operation for a long period, the maintenance work to periodically evacuate air from outside by connecting a vacuum pump to the vacuum container is not necessary.

Thus, the maintenance cost can be reduced.

What is claimed is:

1. A radio receiver comprising a signal processing part that processes a receive signal, a cooling means that cools said signal processing part and a sealing means that seals in vacuum said signal processing part, wherein said sealing means is composed of an inner sealing means that houses and seals in vacuum said signal processing part, and an outer sealing means that houses said inner sealing means and seals in vacuum the exterior of said inner sealing means, wherein said outer sealing means is composed of a plurality of sealing means, and a sealing means of said plurality of sealing means placed nearer said signal processing part is sealed in vacuum in sequence, and a vacuum insulating space is formed between said inner sealing means and said outer sealing means.

2. The radio receiver according to claim 1, wherein said sealing means is composed of a vacuum container.

3. The radio receiver according to claim 1, wherein said sealing means is provided with a gas absorbing means that has a gas absorption function to condense and trap gaseous molecules.

4. The radio receiver according to claim 3, wherein said gas absorbing means is composed of a plurality of gas absorbing means that are used according to kind and partial pressure of gas to be absorbed.

5. The radio receiver according to claim 3, wherein said gas absorbing means is composed of a gas absorption type pump.

6. The radio receiver according to claim 5, wherein said gas absorption type pump is composed of a plurality of gas absorption type pumps used according to kind and partial pressure of gas to be absorbed.

7. The radio receiver according to claim 5, wherein said gas absorption type pump is composed of ion pump, getter pump sublimation pump or cryopump.

8. The radio receiver according to claim 3, wherein said gas absorbing means is composed of fins.

9. The radio receiver according to claim 3, wherein said gas absorbing means is composed of a gas absorbing material.

10. The radio receiver according to claim 9, wherein said gas absorbing material is composed of a plurality of gas absorbing materials used according to kind and partial pressure of gas to be absorbed.

11. The radio receiver according to claim 9, wherein said gas absorbing material is composed of activated carbon, molecular sieve or silica gel.

12. The radio receiver according to claim 9, wherein said gas absorbing material is composed of metal including at least one selected from titanium, aluminum, molybdenum, tantalum, zirconium, barium and niobium.

13. The radio receiver according to claim 9, wherein said gas absorbing material is composed of hydrogen storing alloy.

14. The radio receiver according to claim 3, wherein said gas absorbing means is a sublimation pump filament.

15. The radio receiver according to claim 14, wherein said sublimation pump filament operates as a sublimation pump, prior to said outer sealing means being sealed to clean surfaces of the outer sealing means to provide a clean activated metal surface with greater getter function.

16. The radio receiver according to claim 14, wherein said sublimation pump filament periodically operates as a sublimation pump, after said outer sealing means is sealed to clean activated metal with greater getter function, said sublimation pump filament is temporarily connecting a power supply terminal.

17. The radio receiver according to claim 1, wherein at least part of said signal processing part is composed of a superconductive material.

18. The radio receiver according to claim 17, wherein said superconductive material is composed of a high-temperature superconductor.

19. The radio receiver according to claim 1, wherein said inner sealing means is provided with a cooling stage.

20. The radio receiver according to claim 19, wherein said inner sealing means is provided with said gas absorbing means at its outer side via the cooling stage.

21. The radio receiver according to claim 1, wherein said inner sealing means is connected to said cooling means via said cooling stage.

* * * * *